June 16, 1936.　　　　F. L. HESS　　　　2,044,569
FILM REEL
Filed June 4, 1934
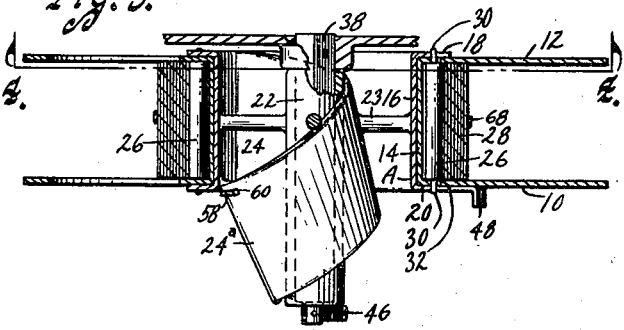
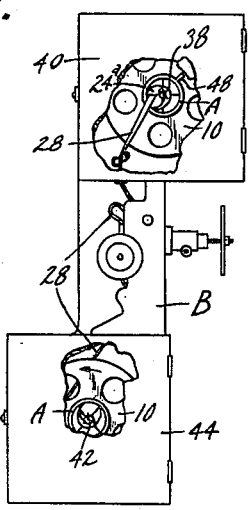
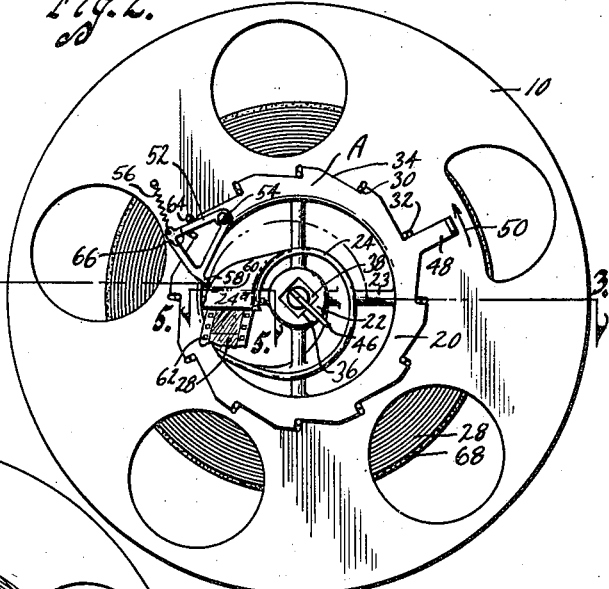
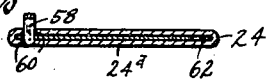
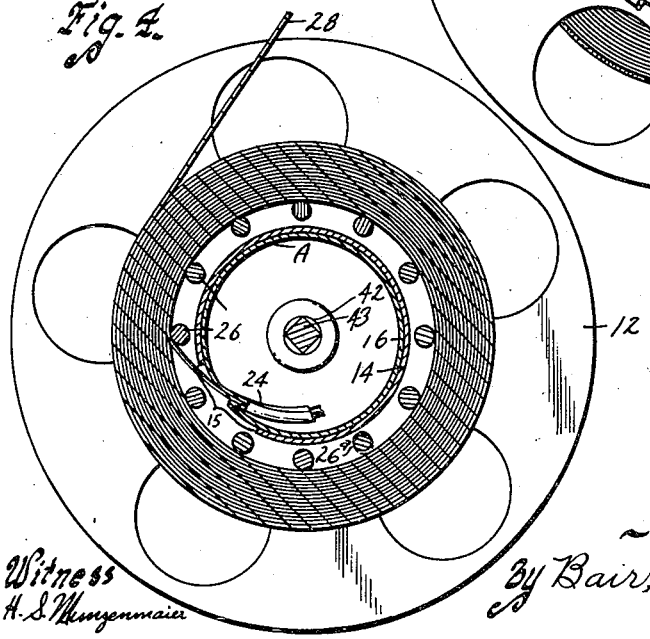
Inventor
~ Floyd L. Hess ~
By Bair, Freeman & Sinclair
Attorneys
Witness
H. S. Munzenmaier Patented June 16, 1936

2,044,569

UNITED STATES PATENT OFFICE 2,044,569

FILM REEL

Floyd L. Hess, Des Moines, Iowa

Application June 4, 1934, Serial No. 728,975

6 Claims. (Cl. 88—18.7)

The object of my invention is to provide a film reel from which the film can be unreeled beginning with the end first started on the reel when reeling the film thereon, the reel, however, being of comparatively simple and durable construction yet inexpensive to manufacture.

Still a further object is to provide a reel for film or the like which eliminates the necessity of having to rewind the film after it is wound thereon so that the starting end of the film is on the outside of the reel rather than on the inside.

A further object is to provide a film reel having at its central portion a guide means through which the film can be unreeled from the interior of the coil of the film on the reel instead of having to be unreeled from the outside.

A further object is to provide means to loosen the coils of the film when it is ready to unreel the film from the reel.

Still another object is to provide a locking means for the starting end of the film when starting to roll the film on the reel, such locking means being simultaneously operable by the means which loosens the coils of film preparatory to unreeling the film from the reel.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a side elevation of a moving picture camera showing a pair of my improved type of reels mounted therein, one from which the film is being unreeled and the other arranged for the film to be wound thereon.

Figure 2 is an enlarged side elevation of the reel adjusted for unreeling of the film.

Figure 3 is a sectional view on the line 3—3 of Figure 2.

Figure 4 is a sectional view on the line 4—4 of Figure 3 showing the parts adjusted for winding the film on to the reel; and Figure 5 is a sectional view on the line 5—5 of Figure 2 showing a film guide.

On the accompanying drawing I have used the reference numerals 10 and 12 to indicate side plates of my reel. These are connected in any suitable manner, such as by a sleeve 14, which on the drawing is shown as being closed with the exception of a slotted area 15.

Oscillatable within the reel comprised of the elements 10, 12 and 14 is a sleeve like cam A having a tubular portion 16 and side flanges 18 and 20 contacting with the outer surfaces of the flanges or side plates 10 and 12 of the reel, as perhaps best shown in Figure 3. The cam A is supported on a hub 22 as for instance by spokes 23. A spirally arranged flattened film tube 24 extends from the tubular sleeve 16 and is suitably supported by the sleeve and the spokes 23 which extend to it, as indicated on the drawing, but do not extend through it. The cross sectional shape of the tube 24 is best shown in Figure 5.

For unreeling purposes, which will hereinafter appear, rollers 26 are provided for the film 28 to wind on rather than having it wind on the sleeve 14. These rollers are provided with pintles 30 at their ends which extend through radially arranged slots 32 in the side plates 10 and 12. Obviously, in winding the film on the rollers 26 the film will tend to contract these rollers toward the inner ends of the slots 32. They can be forced toward the outer ends of the slots, however, by the cam A which has for each pintle 30 an inclined edge 34.

The hub 22 is provided with an angular opening such as indicated at 36 and shown as square on the drawing, for coaction with either a stationary stub shaft 38 in an unreeling cabinet 40 of a motion picture machine B or with an angular end 43 of a driven shaft 42 in the reeling up cabinet 44 of the machine. The shafts 38 and 42 may be provided with a suitable locking device, such as a lever 46, as shown in Figure 3, to prevent the reel from slipping off the shafts.

The cam A is provided with a suitable lever 48 for oscillating it. The cam has been rotated in the direction of the arrow 50 (see Figure 2) for permitting the pintle 30 and the rollers 26 to contract. When the lever is moved in the opposite direction, it expands the rollers.

In connection with the tube 24, and preferably the discharge end 24a thereof, I provide a film locking lever 52. It is pivoted as at 54 on the cam A and is constrained to an unlocking position by a spring 56. It has a finger 58 adapted to enter openings 60 formed through the walls of the tube in such position that the finger 58 may extend through one of the sprocket holes 62 of the film 28.

A stationary pin 64 is mounted on the side plate 10 to coact with an inclined surface 66 of the locking lever 52 in a manner which will hereinafter be fully set forth.

Practical operation

In the operation of my improved film reel, assuming the film has been completely reeled up as in Figure 4, a rubber band is slipped over one of the plates 10 or 12 and allowed to contact on the periphery of the film as indicated at 68. The lever 48 is then moved in the direction of the arrow 50 so that it assumes the position shown in Figure 2, which permits the rollers 26 to contract, as for instance, to the position of one of the rollers indicated at 26a in Figure 4. In thus moving the cam A counter-clockwise, the spring 56 pulls the locking finger 58 out of the openings in the tube 24 and also out of the sprocket hole of the film 28 with which it was coacting.

The reel can now be slipped on the stationary stub shaft 38 so that in unreeling the film the reel does not rotate, which is contrary to the general present day practice.

The film is now sufficiently loose that it can be easily unreeled from the inside rather than from the outside, as is generally done. The end of the film projecting from the tube 24 may be properly re-threaded through the feeding mechanism of the moving picture machine B and its lower end threaded into the tube 24 of the reel in the lower cabinet 44 as shown in Figure 4. This end of the film is extended between two of the rollers 26 as illustrated and into the tube 24 to project slightly from the inner end 24a of the tube. The lever 48 of the lower reel is then moved in a direction opposite the arrow 50 so as to expand the rollers 26 to the position shown in Figure 4 and at the same time swing the locking finger 58 to lock the extending end of the film in position due to the coaction of the stationary pin 64 with the inclined surface 66 of the locking lever 52.

Locking of the end of the film, of course, is necessary inasmuch as the shaft 42 rotates and likewise rotates the reel with it for winding up the film. The usual mechanism for accomplishing this reeling up is a belt which can slip and therefore whatever tension there is on the belt tends to roll the film just that tightly on the reel. If its inner end were not locked, it, of course, would be immediately pulled off the reel.

Heretofore it has been the usual practice after film is wound on a reel in the lower cabinet 44 to wind it by hand or by some motor driven machine or the like, on to another reel so that the beginning end is on the outside of the roll rather than on the inside. This requires additional time and is quite objectionable, especially in home movie outfits where the loss of such time delays the entertainment.

By my invention the rewinding of the film is entirely unnecessary. The simultaneous operation of the cam A and the locking lever 52 insures that the rollers 26 will be expanded before reeling up the film as if they are not, then the lock will not be operated and the film will slip out. On the other hand the single operation of adjusting the cam loosens the film so that two operations are not required before winding up the film.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with a film reel, a guide tube for film at the center of said reel having a discharge end directed to discharge film from the inner end of a coil of film on said reel to the side thereof, said reel including a series of circumferentially spaced rollers for said film to be reeled upon, means for radially moving said rollers relative to said reel and a lock associated with said guide tube for locking the film against movement therein, said means being connected with said lock to unlock it simultaneously with the movement inwardly of said rollers by operating said means.

2. In combination with a film reel, a guide tube for film at the center of said reel having a discharge end directed to discharge film from the inner end of a coil of film on said reel to the side thereof, said reel including a plurality of rollers on which said film is reeled when said reel is rotated, said rollers having pintles, said rollers being movable radially and means for moving them radially outward before reeling film thereon and radially inward before unreeling film from the inner end of the coil of film reeled thereon, said means comprising an oscillatable cam having inclined portions engaging said pintles.

3. A film reel including radially movable elements on which film is reeled, a cam having cam surfaces engaging said elements for expanding and contracting them when moved in opposite directions respectively, a guide tube for film at the center of said reel having a discharge end at the side thereof and a lock pin for extending into a sprocket hole in film in said guide tube, said pin being carried by said cam and projectible to locking position when the cam is moved to expanding position and unlocking position when the cam is moved to contracting position.

4. In combination with a film reel comprising side plates having slots therein, means extending between said side plates on which said film may be reeled and having portions projecting through said slots, a rotatable cam for engaging said projecting portions and moving them outwardly upon rotation in one direction relative to said film reel, a guide tube for film at the center of said reel having a discharge end at the side thereof and a lock pin for extending into a sprocket hole of film in said guide tube and said pin being extended to locking position by said cam when it is rotated in one direction and withdrawn to unlocking position when it is rotated in the other direction.

5. In combination with a film reel comprising side plates having slots therein, means extending between said side plates on which said film may be reeled and having portions projecting through said slots, a rotatable cam for engaging said projecting portions and moving them outwardly upon rotation in one direction relative to said film reel, and a guide tube for film at the center of said reel having a discharge end at the side thereof.

6. In combination with a film reel comprising side plates having slots therein, means extending between said side plates on which said film may be reeled and having portions projecting through said slots, a rotatable cam disk having a cam surface for engaging each of said projecting portions and moving them outwardly upon rotation in one direction relative to said film reel, a guide tube for film at the center of said reel having a discharge end at the side thereof and a lock pin for extending into a sprocket hole of film in said guide tube, said pin being extended to locking position by said cam disk when it is rotated in one direction and withdrawn to unlocking position when it is rotated in the other direction.

FLOYD L. HESS.